(12) United States Patent
Koturbach

(10) Patent No.: US 11,578,469 B2
(45) Date of Patent: Feb. 14, 2023

(54) ELECTRICAL GENERATING ECOLOGICAL FLOOD CONTROL SYSTEM

(71) Applicant: Ivan Ivanovich Koturbach, Mukachevo (UA)

(72) Inventor: Ivan Ivanovich Koturbach, Mukachevo (UA)

( * ) Notice: Subject to any disclaimer, the term of this patent is extended or adjusted under 35 U.S.C. 154(b) by 0 days.

(21) Appl. No.: 16/967,394

(22) PCT Filed: Jan. 1, 2019

(86) PCT No.: PCT/UA2019/000019
§ 371 (c)(1),
(2) Date: May 5, 2021

(87) PCT Pub. No.: WO2019/160524
PCT Pub. Date: Aug. 22, 2019

(65) Prior Publication Data
US 2022/0064889 A1 Mar. 3, 2022

(30) Foreign Application Priority Data
Feb. 16, 2018 (UA) .............. u 2018 01524

(51) Int. Cl.
*E02B 9/06* (2006.01)
(52) U.S. Cl.
CPC .................... *E02B 9/06* (2013.01)
(58) Field of Classification Search
CPC ..... E02B 3/00; E02B 8/06; E02B 9/02; E02B 9/06; E03F 1/001
See application file for complete search history.

(56) References Cited

U.S. PATENT DOCUMENTS

| | | | | |
|---|---|---|---|---|
| 2,962,599 A * | 11/1960 | Pirkey | ............. | F03B 13/06 290/43 |
| 4,109,160 A * | 8/1978 | Goto | ............. | F03B 13/06 415/17 |
| 5,360,290 A * | 11/1994 | Yamada | ............. | F04D 29/448 210/170.03 |
| 5,752,785 A * | 5/1998 | Tanaka | ............. | E03F 5/22 210/170.03 |
| 5,909,982 A * | 6/1999 | Takada | ............. | E02B 11/00 405/80 |
| 6,000,880 A * | 12/1999 | Halus | ............. | E02B 9/00 405/36 |
| 7,429,147 B2 * | 9/2008 | Marchetti | ............. | E02B 9/00 405/80 |

(Continued)

FOREIGN PATENT DOCUMENTS

GB 2379236 B * 9/2003 .............. E02B 3/02

*Primary Examiner* — Benjamin F Fiorello
(74) *Attorney, Agent, or Firm* — Inventa Capital PLC

(57) ABSTRACT

Electric Generating Ecological Flood Control System which consists of selective collector, pressing pipeline, exiting collector, electric generator which is differs that pressing pipeline is lay under the bottom of the river or on the bottom of the river or in the water or above the water, where through the pressing collector carries out diversion of flood waters outside the area of possible flooding zones, while the regulation of amount and speed of water flows carries out according to additional leading one device regulative armature, that installed on pipeline and done with possibility of regulation exiting ability.

9 Claims, 2 Drawing Sheets

(56) References Cited

U.S. PATENT DOCUMENTS

| | | | | |
|---|---|---|---|---|
| 7,632,040 | B2* | 12/2009 | Cripps | E02B 9/00 |
| | | | | 290/1 R |
| 7,866,919 | B2* | 1/2011 | Miller | F03B 13/06 |
| | | | | 405/80 |
| 9,261,068 | B2* | 2/2016 | Barakat | F03B 13/00 |
| 10,213,815 | B1* | 2/2019 | Baugh | E02B 3/041 |
| 10,359,027 | B2* | 7/2019 | Barakat | F03B 13/08 |
| 10,947,957 | B1* | 3/2021 | Bandy | H02K 7/108 |
| 2001/0022085 | A1* | 9/2001 | Stewart | F03G 7/04 |
| | | | | 60/641.1 |
| 2014/0193201 | A1* | 7/2014 | Stauffer | E02B 9/06 |
| | | | | 405/75 |

* cited by examiner

ELECTRICAL GENERATING ECOLOGICAL FLOOD CONTROL SYSTEM

FIELD OF THE INVENTION

The present invention relates to the field of hydrotechnical buildings for areas protection from floods, by diversion of flood waters from zones of its formation, bypass zone of probable (dangerous) flooding, with previous downgrade water's level in pre-flood and flood period due to transfer a part of river's stream from steady flow into pressing by pipeline, lay under the bottom of the river.

BRIEF DESCRIPTION OF THE INVENTION

Invention belongs to hydrotechnical buildings, appointed for areas protection from floods, by diversion of flood waters from zones of its formation, bypass zone of probable (dangerous) flooding, with previous downgrade water's level in pre-flood and flood period due to transfer a part of river's stream from steady flow into pressing by pipeline, lay under the bottom of the river. Invention can be used for producing electricity and for downgrade strength of ice.

Famous flood control methods of protection «Kinds of flood control», Zhorova. V. M. Subirian Federal University Engineering Institute, UDK (source 1) and «Protection from rain floods by making river rapids» Kolosov M. A., Seleznyova N. V., Bulletin of State University the Navy and River Fleet named after Admiral S. O. Makarova, edition 4 (88) 2016, UDK 627.8 (source 2).

These sources as flood control methods of protection shows the opportunity artificial lift of dangerous territories, which is floods, designing anti-flood water reservoirs, construction auxiliary anti-flood channel, increasing passing ability of the river, straightening of river beds, building of water dams.

Disadvantages of such methods of protection is that artificial rising of landscapes has high self-cost, in case of a necessity to rise all the buildings and engineering construction in the area to prevent potential flooding which in its turn leads to landscape erosion and is insufficient.

Another disadvantage of construction of anti-flood water reservoirs is a low effectiveness, deterioration of landscape, the need of big areas to be allocated for potential flood zone, which economically and technically cost insufficient in conditions of lack of lands and mountain landscapes.

Also another disadvantage of construction of anti-flood water reservoirs is deterioration of landscape, necessity in big area to be allocated for auxiliary water channels, sedimentation, ineffective in case of ice drifts and congestions, the impossibility of construction in mountain areas, low water passing through volumes which doesn't solve problems of water floods.

Disadvantage of construction of anti-flood water as increasing of passing through volumes by deeping the bottom of the river, is high self-cost, fast contamination by flood pumps, insufficient in ice drifts and congestions in constant investments.

By straightening river beds the main disadvantage is spoiling landscapes, low effectiveness, necessity to give big areas of lands, impossibility to use in mountain areas. Disadvantage of anti-flood water method of protection as dams is spoiling landscapes, low effectiveness and high cost of building dams.

The main goal of Invention in creating system of anti-flood water protection for solving fast drainage of flood water from the zone of its formation, avoid zone of possible flooding, with lowing water level in pre-flooding and flooding period, dividing term by the time and transferring a part of stream from constant to pressing, lowing of strength of ice, harm prevention from flooding and producing of electricity.

Pointed task can be solved that power generating ecological anti-flood system which is consists of selective collector, pressing pipeline, exiting collector, electro generator, according to Invention, pressing pipeline lay under the bottom of the river or in the bottom of the river or in the river or above the river, where through pressing pipeline diverting of flood water out of the areas as possible flooding, due to this regulation amount and speed of water flow carry out by additional led in at least one device of regulating armature, which installed on pipeline, and which done with possibility of regulation exiting ability. Additionally led in at least two devices of regulating armature, which installed at the beginning and in the end of pipeline.

Technical result of pointed object is speeding up drainage of water flood from the zone of possible flooding, lowing water level in the river in pre-flooding and flooding period, creating of dividing term by time, lowing strength of ice, creating measures for prevention harm from territory flooding and gain the result of work of offered system wide existing possibilities of getting electricity in case of producing through transformation water energy into electrical due to work of system by natural height difference at the exit of the pressing pipeline.

Totality of famous and new significant signs offered flood control system allows with the help of the pressing pipeline which is lay under the bottom of the river or at the bottom of the river or in water or above water to make divert a part of flooding water from the zone of flooding formation out of the areas of possible flooding by transferring it from constant flow into pressing, with regulating amount and speed of water flow additionally led in at least one device of regulating armature, which installed on the pipeline and which is used with the possibility of regulating exiting ability.

Besides amount of significant signs of offered system gain technical result, which is improve ecological situation and realization offered anti-flood system will not have negative influence for ecology, will not lead for ice and congestion, and also exclude opportunity of freezing of the pressing pipeline, that is fully responds to offered task.

SUMMARY OF THE INVENTION

Electric Generating Ecological Flood Control System which consists of selective collector, pressing pipeline, exiting collector, electric generator which is differs that pressing pipeline is lay under the bottom of the river or on the bottom of the river or in the water or above the water, where through the pressing collector carries out diversion of flood waters outside the area of possible flooding zones, while the regulation of amount and speed of water flows carries out according to additional leading one device regulative armature, that installed on pipeline and done with possibility of regulation exiting ability.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

For realization of anti-flood system through pressing pipeline drains a part of flow of flooding water from the zone of formation out of the territory areas of possible flooding transfer this flow of flooding water from constant to pressing, directing flow of flooding water to the pressing pipeline, which is lay under the bottom of the river or at the bottom of the river or in water or above water. While working of offered system due to natural height difference on the exit of the pressing pipeline makes producing of electrical energy through transforming water energy into electrical.

Figure 1:
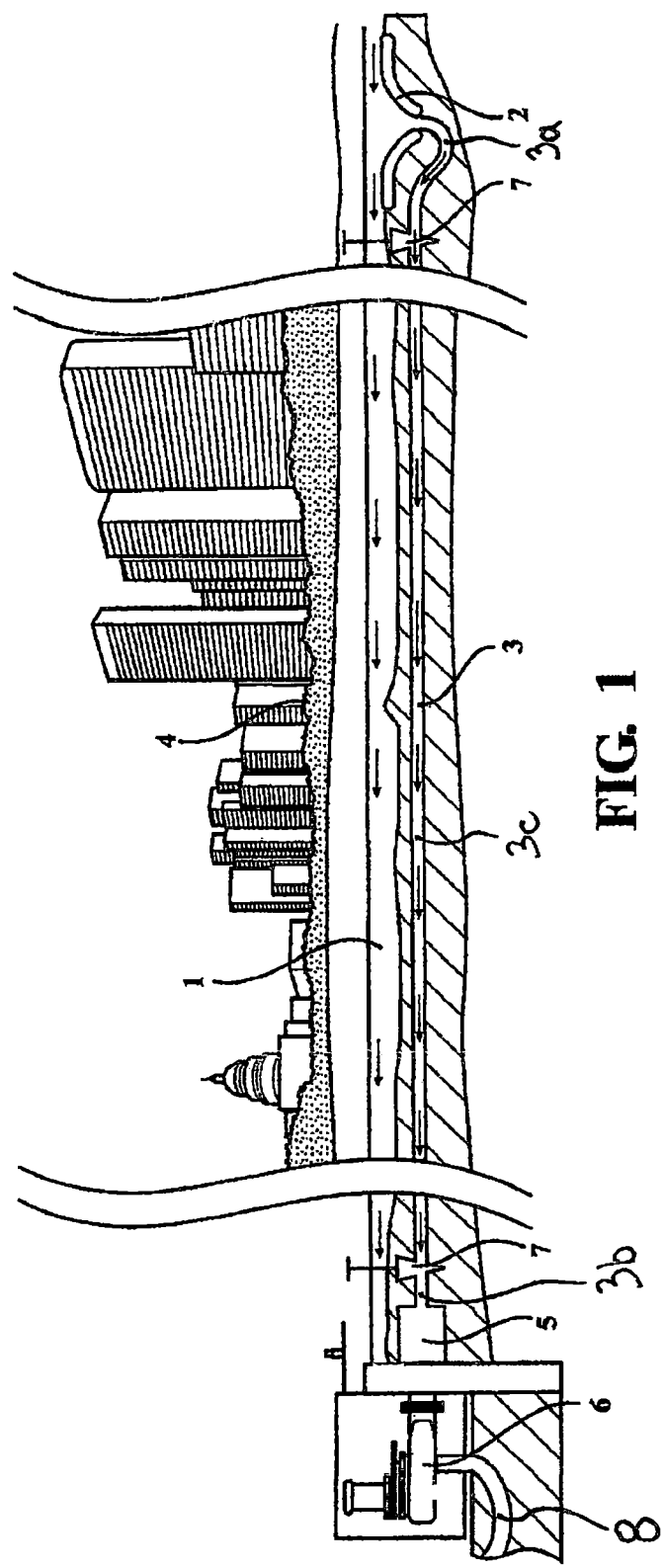
FIG. 1 illustrates a shape of system in incision on the side.
Figure 2:
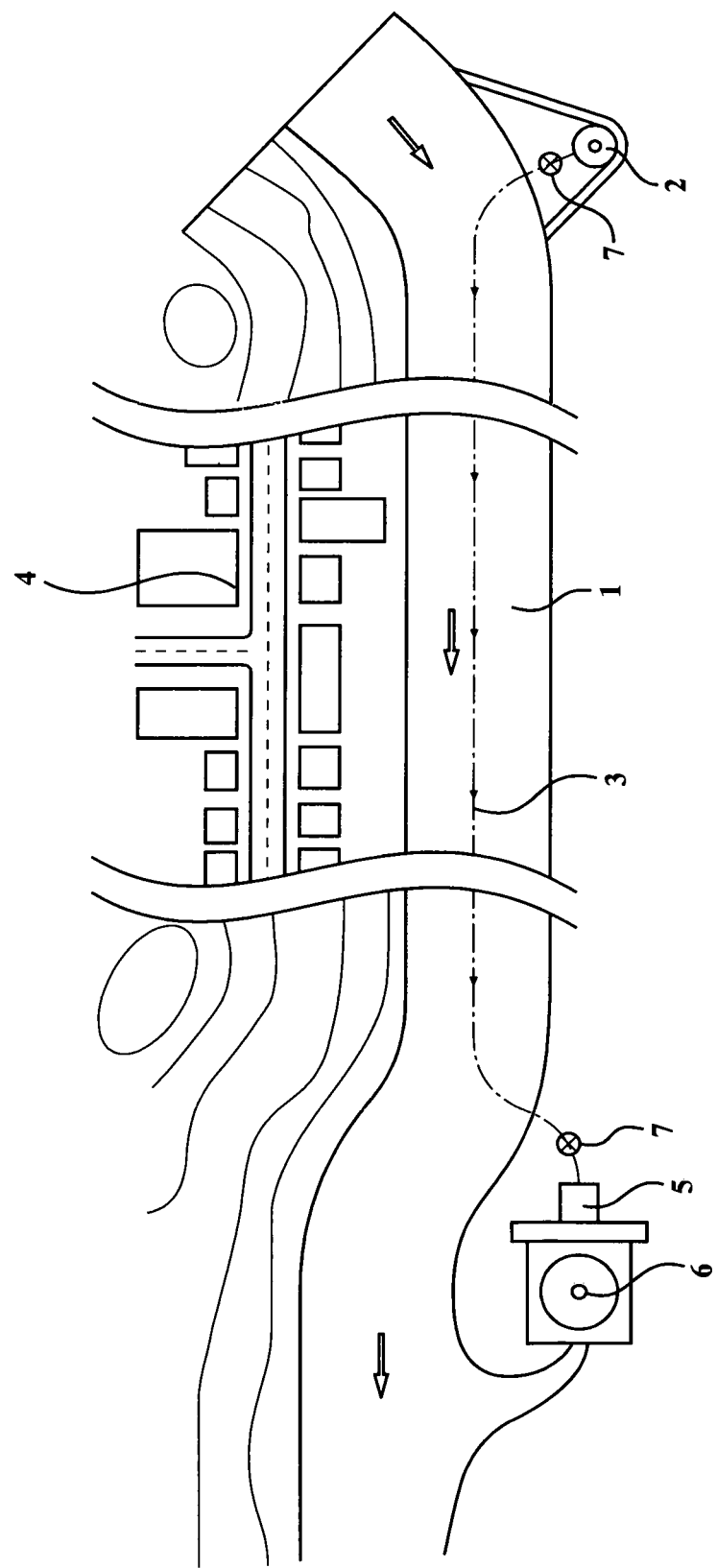
FIG. 2 illustrates a general shape of system.

Invention is explained by drawing (scheme) electro generating ecological anti-flood system shown in the drawings of FIG. 1 and FIG. 2 where: near the main channel of the river 1 from the side equipped offshoot with selective collector 2, connected with the pressing pipeline 3 having a first end 3a, a second end 3b, and an elongated portion 3c extending therebetween, which lays or extends under the bottom of the river (FIG. 1), or along or on the bottom of the river, or in water or above water (FIG. 2) and goes out of the territory of possible flooding 4, and being connected with exiting collector of pipeline 5, to which generator 6 is connected. As shown in FIG. 1, the generator 6 includes a pipeline 8 that is used to direct the water used for electrical power generation by the generator 6 back into the river 1 in an area away from the territory of possible flooding 4, as best shown in FIG. 2.

Regulation of throughput ability and speed of flow conducts with the help at least one regulating armature 7, done in shape of valves and latches which is set at one part of plumbing, for example near selective collector 2, or install at least two regulating armatures 7, from the both sides of plumbing one near selective collector 2, second near generator 6.

Example of realization appointed system. At the moment of appearing of flood danger, rising or possible rising of river, open regulating valves and latches 7, part of water flow of the main channel of the river 1 goes to the pressing pipeline 3, which is lay under the bottom of the river or lay on the bottom of the river or in water or above water and directing to outgoing part of the pipeline 5, which situated out of the zone of flooding 4, and as the result natural height difference water flow under the pressure directs to electro generators or drain into the river 1.

What is claimed is:

1. An electro-generating anti-flood control system for a body of water in a flood zone and having a top surface and a bottom, the system configured to prevent the body of water from overflowing and to generate electrical energy comprising:
    an inlet water collector disposed adjacent to the body of water and being connected in fluid communication with the body of water such that the inlet water collector can receive water from the body of water;
    a pipeline having a first end, a second end, and an elongated portion extending therebetween, the elongated portion of the pipeline is submerged in the body of water and extending along the bottom of the body of water, the first end of the pipeline is connected in fluid communication with the inlet water collector, and wherein at least the first end of the pipeline is positioned below the top surface of the body of water;
    a regulating valve installed outside of the body of water and downstream of the inlet water collector, the regulating valve is configured to selectively regulate amount and speed of water that is gravity fed into the pipeline;
    an outlet water collector connected in fluid communication with the second end of the pipeline; and
    a generator positioned outside of the body of water and being connected in fluid communication with the outlet water collector;
    wherein the generator is configured to:
        receive the water directed by the pipeline;
        convert motive power of the water received under pressure into electrical power; and
        direct the water back into the body of water in a zone downstream of and away from the flood zone.

2. The electro-generating anti-flood control system of claim 1, wherein the pipeline includes a second regulating valve installed upstream of and near the outlet water collector to selectively regulate amount and speed of water exiting the pipeline into the outlet water collector.

3. The electro-generating anti-flood control system of claim 2, wherein the second regulating valve is positioned outside of the body of water.

4. The electro-generating anti-flood control system of claim 1, wherein the generator includes a second pipeline that extends into the body of water in the zone downstream of and away from the flood zone.

5. The electro-generating anti-flood control system of claim 1, wherein the outlet water collector is disposed outside of the body of water and downstream of the inlet water collector.

6. The electro-generating anti-flood control system of claim 1, wherein the first end of the pipeline is disposed outside of the body of water.

7. The electro-generating anti-flood control system of claim 1, wherein the first end of the pipeline is curved and extends into the body of water such that the elongated portion of the pipeline can extend through the body of water, and wherein the second end of the pipeline is curved and extends out of the body of water to connect to the generator positioned outside of the body of water a distance away from the flood zone.

8. The electro-generating anti-flood control system of claim 7, wherein the first end of the pipeline is curved and extends into the body of water such that the elongated portion of the pipeline can extend through the body of water, and wherein the second end of the pipeline is curved and extends out of the body of water to connect to the generator positioned outside of the body of water a distance away from the flood zone.

9. An electro-generating anti-flood control system for a body of water in a flood zone and having a top surface and a bottom, the system configured to prevent the body of water from overflowing and to generate electrical energy comprising:
    an inlet water collector disposed adjacent to the body of water and being connected in fluid communication with the body of water such that the inlet water collector can receive water from the body of water;
    a first pipeline having a first end, a second end, and an elongated portion extending therebetween, the first and second ends of the first pipeline are positioned outside of the body of water and the elongated portion of the first pipeline is submerged in the body of water and extending along the bottom of the body of water, the first end of the first pipeline is connected in fluid communication with the inlet water collector, and wherein at least the first end of the first pipeline is positioned below the top surface of the body of water;

a regulating valve installed outside of the body of water and downstream of the inlet water collector, the regulating valve is configured to selectively regulate amount and speed of water that is gravity fed into the first pipeline;

an outlet water collector connected in fluid communication with the second end of the first pipeline;

a second regulating valve installed outside of the body of water and upstream of and near the outlet water collector to selectively regulate amount and speed of water exiting the first pipeline into the outlet water collector; and a generator positioned outside of the body of water and being connected in fluid communication with the outlet water collector, wherein the generator includes a second pipeline that extends into the body of water, and wherein the generator is configured to:
  receive the water directed by the first pipeline;
  convert motive power of the water received under pressure into electrical power; and
  direct the water via the second pipeline back into the body of water in a zone downstream of and away from the flood zone.

\* \* \* \* \*